United States Patent [19]

King et al.

[11] Patent Number: 5,357,995
[45] Date of Patent: Oct. 25, 1994

[54] SELF-CLEANING SLURRY METERING VALVE

[75] Inventors: Gerald V. King; Kenneth J. Busch, both of Odem; Thomas M. Kenesson, Corpus Christi, all of Tex.

[73] Assignee: Hoechst Celanese Corporation, Somerville, N.J.

[21] Appl. No.: 32,871

[22] Filed: Mar. 18, 1993

[51] Int. Cl.$^5$ ............................ F16K 31/04; F17D 3/01
[52] U.S. Cl. ................................ 137/8; 73/863.03; 73/863.86; 134/116 C; 137/15; 137/238; 137/245; 137/486; 137/487.5; 222/149; 251/122; 251/129.04; 251/205
[58] Field of Search ........... 73/863.02, 863.03, 863.86; 137/238, 244, 486, 487.5, 497, 503, 504, 563, 605, 861, 862, 1, 2, 8, 9, 245; 251/122, 129.04, 205, 208, 209; 222/148, 149; 134/166 C, 169 C

[56] References Cited

U.S. PATENT DOCUMENTS

| | | | |
|---|---|---|---|
| 1,619,937 | 3/1927 | Huff | 251/122 |
| 1,806,565 | 5/1931 | Russel | 251/122 |
| 1,911,905 | 5/1993 | Knowlton et al. | 251/122 |
| 2,516,825 | 7/1950 | Hejduk et al. | 251/122 |
| 2,682,277 | 6/1954 | Marshall et al. | 137/240 |
| 2,743,909 | 5/1956 | Lawtor | 137/563 |
| 2,881,783 | 4/1959 | Andrews | 137/244 |
| 3,240,230 | 3/1966 | Callahan, Jr. et al. | 251/205 |
| 3,282,113 | 11/1966 | Sachnik | 73/863.02 |
| 4,026,324 | 5/1977 | King et al. | 137/238 |
| 4,195,654 | 4/1980 | Coley | 137/238 |
| 4,281,935 | 8/1981 | Cramer et al. | 137/243.7 |
| 4,911,200 | 3/1990 | Ben-Arie | 137/486 |

*Primary Examiner*—George L. Walton
*Attorney, Agent, or Firm*—James J. Mullen; Stuart D. Frenkel

[57] ABSTRACT

A valve for metering a slurry includes a primary flow path for directing a continual flow of slurry through the valve, a valve stem which extends through the primary flow path and engages a passage in a valve seat for metering a portion of slurry passing through the primary flow path out through a second outlet in the valve. A portion of the valve stem which engages the valve seat passage is cut-away and when placed in communication with the primary flow path allows the flushing of accumulated solids through the valve seat passage to avoid persistent plugging of the valve.

24 Claims, 1 Drawing Sheet

SELF-CLEANING SLURRY METERING VALVE

BACKGROUND OF THE INVENTION

This invention is directed to a slurry metering valve and, in particular, to a valve for metering a relatively small amount of slurry from a larger continuously flowing fluid stream. The invention is also directed to a slurry metering valve which is self-cleaning so as to avoid plugging of the valve and stoppage of metered flow.

When metering a relatively low volume flow of slurry from a feed source to a desired destination for processing, it is necessary to include a circulation loop back to the feed source so that when the metered slurry flow is off-line, the loop stream maintains the slurry fluid and prevents the segregation of the solids from the liquid carrier. Alternative methods have been used to meter a slurry. In one such system, a conventional three-way ball valve containing two outlet ports is used in which the slurry flow from the feed source is alternately sent to one of the outlet ports communicating with either the loop stream or the metered stream. Thus, the ball valve operates as an on and off valve in which slurry flow through the relatively low volume metering line requires that flow through the circulation loop be stopped and vice versa. In applications where transport lines are very small and very low velocities are utilized, the on-off pattern of a typical three-way valve results in gross non-uniform flow as the solids settle and separate from the liquid carrier during flow stoppage both in the circulation loop and in the lower volume metering line. Plugging or substantial non-uniform flow in the lower volume metering line means that the slurry has to be constantly diverted into the circulation loop to maintain the slurry fluid, drastically reducing end use processing rates of the slurry being metered. Alternatively, a slurry metering system has been used which includes the circulation loop to and from the slurry feed wherein the circulation loop is split with a T-connector to divide the slurry flow between the circulation loop and a metering valve which meters the slurry to the desired processing unit. However, the slurry stagnates in the line between the metering valve and the T-connector as the metered flow has a substantially lower volume flow compared to the flow rate of circulation loop. Again, this stagnation leads to solids segregation and plugging, and consequent non-uniform metered flow and reduced processing rates. Accordingly, there is still a need to provide a useful slurry metering valve which can substantially reduce, if not eliminate, the uneven metered flow of a slurry to processing.

Similar to the valve of the present invention which is described hereinafter, valves have been provided to remove from a primary fluid flow a secondary or lower volume flow. For example, U.S. Pat. No. 582,507, issued May 11, 1897, discloses a valve used to remove condensate from a steam line and which includes a passage therethrough for the main flow of gas and a valve stem which passes through the main flow and is seated upon a valve seat which contains a passage from the main flow and directed therefrom. When the valve stem is not seated, condensation in the main gas flow passes through the valve seat and away from the valve and main flow of gas.

U.S. Pat, No. 4,281,935, issued Aug. 4, 1981, discloses a similar valve containing an inlet and outlet for a primary fluid flow, a valve stem which passes through the primary flow and is seated on a valve seat which is located directly across the primary flow path relative to the valve stem and extends into the primary flow. The valve seat includes a passage communicating with the primary flow and with a separate inlet/outlet portion of the valve. The valve is disclosed as being primarily useful for injecting a fluid into the primary flow through the passage contained in the valve seat but, conversely, can be used to remove a small portion of the primary flow through the passage in the valve seat. The valve stem can be rotated relative to the valve seat to clean the same. The valve stem is seated and rotated such as by a hand-wrench as the valve stem and seat are in contact.

Neither of the above patents, however, are concerned with continuously metering a secondary flow from a continuous primary flow. Instead, the patents merely seem to be concerned with an on-off flow of the secondary stream to or from a primary flow stream. Additionally, the patents are not concerned with metering a slurry stream or concerned with the problems attendant therein such as non-uniform flow as the slurry segregates and plugging which may occur upon segregation of the slurry and accumulation of the solids in the valve passages. While U.S. Pat. No. 4,281,935 discloses a cleaning feature, it is necessary that the secondary flow be shut-off from the main flow to clean the valve stem and seat inasmuch as the cleaning action is provided by contacting the valve stem with the valve seat which effectively closes the passage in the valve seat from the primary flow. Thus, the cleaning procedure effectively shuts down the removal of the secondary stream from the primary flow.

Accordingly, it is an object of the present invention to provide an improved metering valve for slurries.

Another object of the present invention is to provide a metering valve which will allow the continuous removal and transport of a relative low volume metered flow of slurry from a primary flow of slurry.

Still another object of the present invention is to provide a slurry metering valve which has self cleaning features so as to maintain a continuous flow of slurry through the valve.

Further still, another object of this invention is to provide a process for continuously metering a flow of slurry from a primary feed source to a processing unit with reduced plugging and without adverse nonuniform flow.

SUMMARY OF THE INVENTION

To meet the objectives of the present invention and to overcome the problems discussed above with respect to metering a slurry, the present invention provides a slurry metering valve having a body member with a primary flow path therethrough from an inlet end to an outlet end and a valve stem connected to the body member which is movable through the primary flow path and into a passage within a valve seat located directly across the primary flow path relative to the valve stem in the valve body member. The passage in the valve seat is exposed to the primary flow path through the valve body and communicates with a separate slurry outlet passage in the valve for transporting a portion of slurry flow from the primary flow path passing through the valve to a separate metered slurry flow out of the valve.

The slurry metering valve of the present invention is self-cleaning in that the metering operation of the valve is not stopped during the cleaning process and no manual operation is needed to clean the valve. One self-cleaning feature of the valve resides in the fact that the primary slurry flow, typically the circulation loop to and from a slurry feed source continually passes through the valve body and constitutes the primary flow path through the valve. Thus, any accumulated solids which attach to the valve stem are washed away by the relatively high volume flow of slurry continually passing through the valve body A second self-cleaning feature of the slurry metering valve of the present invention involves the structure of the valve stem and the actuation thereof within the valve seat. The portion of the valve stem which is seated within the passage of the valve seat is a two-component structure including a metering component which fits within the passage in the valve seat and meters the slurry therethrough, and a cleaning component located at the en of the valve stem and which is partially cut away so as to be substantially narrower than the metering component of the stem. The cleaning component of the valve stem can include a diagonal cut therethrough across at least substantially the full cross section of the valve stem. Slurry solids segregated from the carrier liquid may accumulate at the inlet of the valve seat passage and inhibit slurry flow through the valve seat. The slurry flow through the primary flow path contacts the valve stem passing therethrough and washes accumulated slurry through the primary flow path. Gross accumulation of solids may eventually hinder slurry flow through the valve seat. The slurry valve of this invention includes a means to measure the amount of fluid flow through the valve seat passage and an actuator which operates depending on the measured fluid flow. Upon a lower volume of flow being measured and the measurement fed back to the actuator, the actuator lifts the valve stem through the valve seat passage. When the valve stem is sufficiently raised such that the cut-away portion, for example, a diagonally shaped cross-section, of the valve stem communicates with the primary flow path, there is an initial unmetered larger volume of slurry flow which passes through the valve seat passage and flushes the valve seat passage and washes the accumulated solids therethrough. Once the valve seat passage has been cleared, the higher volume flow is sensed and the measurement again fed back to the actuator which adjusts the valve stem to the desired metered setting. The self-cleaning features of the slurry metering valve maintain uniform flow of the secondary slurry stream and maintain continuous operation of the valve.

DETAILED DESCRIPTION OF THE INVENTION

Figure 1:
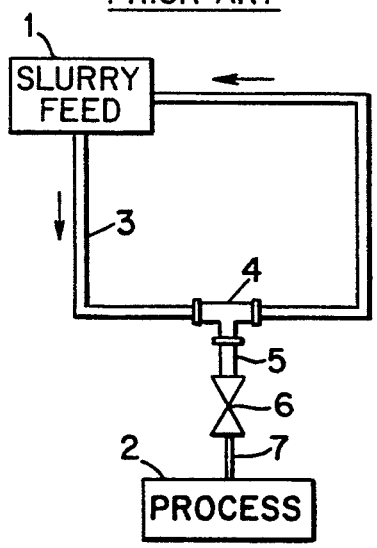
FIG. 1 is a schematic of a prior art system for metering a slurry.

The problems attendant in a slurry metering system in which a volume of slurry must be directed from a feed source to a processing scheme can best be understood by referring to one of the typical prior art processes used for metering a slurry as depicted in FIG. 1. Thus, as shown therein, a slurry provided in a slurry feed source 1 must be transported and metered to a processing unit 2. Processing unit 2 can comprise any type of chemical process equipment such as a chemical reactor and most usefully a separation device such as utilized to separate solid pharmaceutical product from the solvent from which the product was precipitated. In such latter instance, the slurry feed source 1 would be a reactor or product holding tank and the like. In many pilot plant and commercial scale operations, the slurry feed source 1 and the processing unit 2 are widely spaced. In pilot plant and even some commercial scale operations, i.e., pharmaceuticals, low volume slurry feeds are transported along small diameter piping. Metering the slurry directly at the feed source would result in a low volume of slurry being transported over a relatively long distance. The low volume flow in narrow piping would lead to substantial segregation of the solids from the liquid carrier and consequent deposition and accumulation of solids on the inside of the piping. Substantial and persistent plugging of the transport lines would result. Accordingly, this problem has been resolved by incorporating in the metering system a relatively high volume circulation loop 3 which directs the slurry from the slurry feed source 1 to a metering device closer to processing unit 2 and which circulates the unmetered slurry back to the slurry feed source. In one method of metering a portion of the slurry from the circulation loop 3, a T-connector 4 is installed in circulation loop 3 to split-off a portion of the slurry feed from loop 3. The remaining slurry passes through T-Connector 4 and continues as part of loop 3. The diverted or split slurry stream is designated as reference numeral 5. The split slurry stream 5 which is to be metered passes through a metering valve 6 which directs a metered flow of slurry 7 to the process unit 2. However, the split slurry stream 5 is substantially at the same volume and flow rate as the slurry in circulation loop 3 as the slurry enters metering valve 6. Inasmuch as the metered slurry flow 7 has a substantially lower volume than the split stream 5, the flow of slurry in stream 5 begins to stagnate between the valve 6 and T-connector 4. Upon stagnation, the solids segregate from the liquid, deposit and accumulate and cause substantial plugging of stream 5 rendering a uniform flow of slurry to valve 6 extremely difficult to obtain on a sustained basis. Process shut-down is required to clean the plugged split stream and, as well, clean the passages in valve 6 which also are plagued with accumulated solids.

Figure 2:
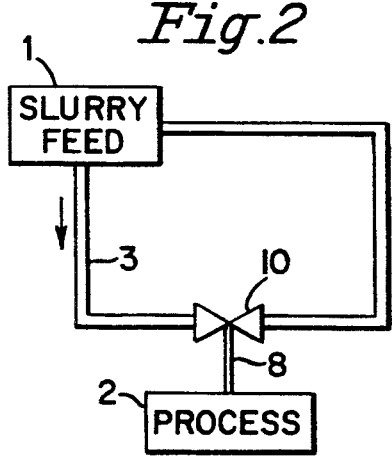
FIG. 2 is a schematic of the slurry metering system of the present invention.

FIG. 2 depicts the slurry metering system of the present invention. In the invention system, a slurry metering valve 10 is placed on-line with the circulation loop 3. Valve 10 includes a primary flow path therethrough to accommodate the volume of the slurry passing through circulation loop 3 from the slurry feed source 1. The metering valve 10 also includes a lower volume passage which meters a portion of the slurry passing through the primary flow path to line 8 at the appropriate flow volume for the processing unit 2. There is no stagnation in valve 10 or in the circulation loop 3 as the excess slurry flow simply passes through the primary flow path in the valve 10. Thus, the stagnation and solid segregation problems which have plagued the prior art systems are not found in the slurry metering system of the present invention. A continuous substantially uninterrupted flow of slurry from a feed source to valve 10 and to the ultimate processing unit is maintained.

Figure 3:
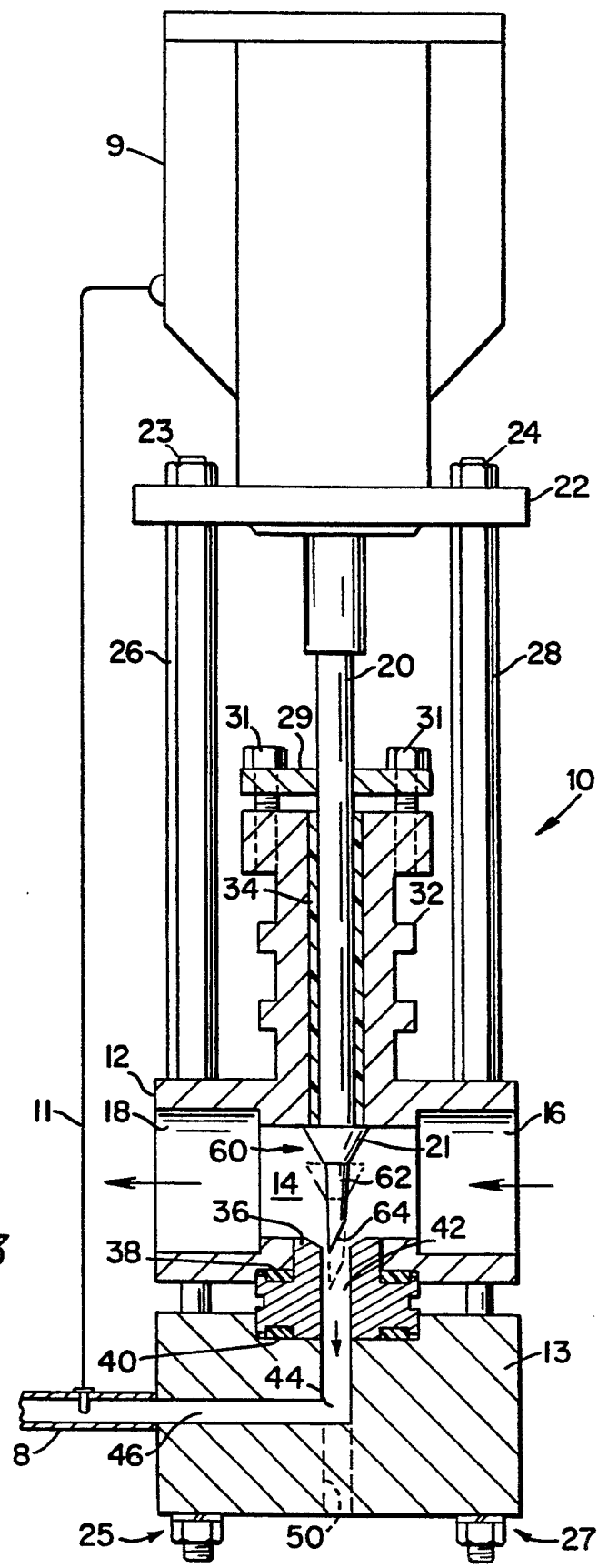
FIG. 3 is a cross-sectional view of the slurry metering valve of this invention.

Referring now to FIG. 3, slurry metering valve 10 containing the embodiments of this invention includes an upper body 12 having a primary fluid flow path 14 therethrough from an inlet 16 to an outlet end 18 for connection to piping such as that which forms a circulation loop to and from a slurry feed source to maintain the slurry fluid and to avoid segregation of the slurry solids from the liquid carrier. Valve 10 includes a valve control mechanism comprising a valve stem 20 which may be actuated by any type of automatically controlled mechanism designated as reference numeral 9 connected to the upper end of valve stem 20. Thus, any known actuating system whether pneumatic, electromechanical, etc. can be used. The specific valve stem actuating system is not critical to the invention. A particularly useful actuator is a pneumatic type such as used on the Model 9460 valve manufactured by Annin. A flow meter 11 is preferably placed downstream of valve 10 in metered flow line 8 (FIG. 2) to determine the volume of metered slurry passing through the valve. The measurement of flow volume is fed back to actuator 9 which sets valve stem 20 to obtain the desired metered flow. Valve stem 20 extends from the actuator 9 and is supported via a yoke 22 which is attached to valve 10 by bolts 23 and 24, threaded through upper valve body 12 and lower valve body 13. Bolts 23 and 24 are placed through guide spacer columns 26 and 28, respectively. Washer and nut assemblies 25 and 27 secure bolts 23 and 24, respectively. Valve stem 20 is further supported by a yoke 29 and extends through a passage in packing gland 32 lined with a friction-resistant material such as a teflon liner 34. Yoke 29 is attached to packing gland 32 by bolts 31. From the passage in packing gland 32 valve stem 20 passes through primary flow path 14 in upper valve body 12. Variations regarding the structure used to support valve stem 20 can be made without departing from the scope of this invention.

Slurry metering valve 10 further includes a valve seat 36 located directly opposite valve stem 20 and across primary flow path 14 from the point where valve stem 20 enters same. The valve stem 20 comprises an upper valving portion 21 that passes through flow path 14 and then into cooperation with valve seat 36. Valve seat 36 is threaded or otherwise secured into upper valve body 12 against a gasket 38 to tightly seal valve seat 36 against upper valve body 12 and to prevent leakage. Gasket 40 also seals the valve seat 36 to lower valve body 13. Within valve seat 36, there is a metering passage 42 which communicates with the primary flow path 14. The position of valve stem 20 within metering passage 42 controls the volume of slurry diverted from primary flow path 14 and into the metered flow path. Valve seat passage 42 also communicates with downstream outlet bore 44 formed within lower valve body 13 and outlet passage 46 placed at a right angle to valve seat passage 42. An alternative outlet passage can be formed in lower valve body 13. Thus, an outlet passage 50 can be drilled into the bottom of lower valve body 13 to communicate with bore 44 as a continuum of valve seat passage 42 instead of the 90° offset placement of outlet passage 46.

The self-cleaning structural features of slurry metering valve 10 can be described by again referring to FIG. 3. During operation of valve 10, a continuous flow of slurry passes through primary flow path 14. There invariably will result some segregation of slurry solids and deposition and accumulation of same on the part of valve stem 20 which is in contact with primary flow path 14. Inasmuch as the slurry passing through primary flow path is of a relatively high volume and is continuously passing therethrough, many of the deposited and accumulated solids will be washed away by the slurry flowing through primary flow path 14 and into contact with valve stem 20. Accordingly, persistent problems of solids accumulation on the lower part of valve stem 20, the surface of valve seat 36 and the inlet of the valve seat passage 42 will be avoided.

However, lower slurry flow rates through the primary flow path 14 of valve 10 may result in segregation of slurry solids and accumulation of slurry solids, in particular, at the inlet of valve seat passage 42 on occasion. Such accumulation of solids could eventually hinder metered flow through valve seat passage 42. The volume of slurry flow passing through valve seat passage 42 is constantly monitored via downstream flow meter 11 which measurement is fed back to actuator 9 to determine the position of the valve stem within valve seat passage 42. Flow meter 11 can measure volume flow rate directly or indirectly by measurement of pressure and even temperature, etc. Valve stem 20 includes a lower portion positioned below and adjacent said valve stem upper valving portion 21 and which fits within valve seat passage 42 and is designated by reference numeral 60. The lower valve stem portion 60 is itself divided into two components, a metering component 62 and a cleaning component 64. The metering component 62 of valve stem 20 includes a conventional slight downstream taper which allows for control of the volume of fluid flow through valve seat passage 42, i.e., metered flow. Thus, as more of metering component 62 of the valve stem 20 is placed within valve seat passage 42, a lesser volume of flow results whereas conversely, as valve stem 20 is raised, the more narrow width of metering component 62 seated at the inlet of valve seat passage 42 allows for increased flow of slurry to pass therethrough. On the other hand, self-cleaning component 64 of valve stem 20 is a cut-away portion at the end of valve stem 20. As shown in FIG. 3, this cut-away portion can be a diagonal cut across the width of the lower portion 60 of valve stem 20. Regardless of whether metering component 62 or cleaning component 64 is placed at the inlet of valve seat passage 42, a portion of valve stem 20 is always in engagement with valve seat passage 42 so as to maintain communication and proper alignment between valve stem 20 and valve seat passage 42.

The cleaning component 64 of valve stem 20 operates in the following manner. On those occasions when accumulated, segregated solids essentially block valve seat passage 42 from the slurry flowing through the primary flow path 14, the reduction in flow rate through the metering portion of valve 10 will be measured downstream by means of flow meter 11 and the flow rate fed back to actuator 9. Actuator 9 lifts valve stem 20 a sufficient distance to place the cut-away portion 64 in communication with the primary flow path 14. At this point, there is not a controlled metered flow through valve seat passage 42 but a flushing action as the opening at the inlet of valve seat passage 42 is suddenly increased. The slurry passing through flow path 14 enters valve seat passage 42 in an essentially unmetered flow to flush and remove any accumulated solids blocking valve seat passage 42. Once valve seat passage 42 is cleared, flow meter 11 will again sense the increase in flow and, in response, actuator 9 will again lower valve stem 20 to a metering position in which the metering component 62 of valve stem 20 controls the flow through valve seat passage 42. Stoppage of flow through the primary flow path 14 is avoided and uniform metered flow is quickly attained without substantial disruption of the end processing unit.

The novel construction of the valve of the present invention facilitates cleaning of the valve passages without process shut-down. Continuous slurry flow through the primary flow path and the metering flow path can be maintained simultaneously without substantial segregation and accumulation and deposition of slurry solids sufficient to grossly affect the flow of slurry through the valve for any length of time. The slurry metering valve of the present invention is particularly useful to direct a slurry feed to processing such as the flow of monomer and/or catalyst to a chemical reactor or to direct a slurry product such as pharmaceuticals ibuprofen or acetaminophen to separation or testing without disruption of flow and consequently without disruption of the end of line processing. The metering valve of this invention does not require manual operation to either meter or, more importantly, clean valve passages of normal accumulation of slurry solids.

What is claimed is:

1. A slurry metering valve comprising:
a valve body having a primary flow path therethrough from an inlet end to an outlet end, a valve stem connected to said valve body and movable through said primary flow path, a valve seat located adjacent said primary flow path in said valve body, said valve seat containing a passage therethrough communicating with said primary flow path at a valve seat passage inlet and with a downstream outlet passage in said valve body separate from said primary flow path at a valve seat passage outlet, said downstream outlet passage directing slurry to a location outside said valve body, said valve stem comprising an upper valving portion for movement away and against said valve seat for controlling fluid flow through said outlet passage, said valve stem further comprising a lower portion which is movable through said primary flow path and said valve seat passage, said lower portion of said valve stem containing a metering component and a cleaning component, said metering component including a gradual downward taper to allow control of fluid flow volume through said valve seat passage when said metering component is placed at said valve seat passage inlet, said cleaning component being below said metering component and having a cut-away portion substantially narrower than said metering component to allow greater fluid flow from said primary flow path to effectively flush and remove accumulated solids from said valve seat passage when said cleaning component is placed at said valve seat passage inlet, at least part of said cleaning component of said valve stem being contained within said valve seat passage when said cleaning component is placed at said valve seat passage inlet.

2. The slurry metering valve of claim 1 wherein said cleaning component comprises a diagonal cut across the width of said valve stem.

3. The slurry metering valve of claim 1 including an actuator means connected to said valve stem capable of automatically moving said valve stem through said valve seat passage.

4. The slurry metering valve of claim 1 wherein said valve stem is at a location intermediate said inlet and said outlet ends of said primary flow path.

5. The slurry metering valve of claim 1 wherein said downstream outlet passage from said valve body is at approximately a right angle to the flow direction of said valve seat passage.

6. The slurry metering valve of claim 1 wherein said outlet passage from said valve body forms a straight line passage with said valve seat passage.

7. The slurry metering valve of claim 1 wherein said valve body includes an upper valve body containing said primary flow path and a lower valve body containing said separate outlet passage, said valve seat placed intermediate said upper valve body and lower valve body.

8. The slurry metering valve of claim 1 wherein said cleaning component is placed adjacent the end of said valve stem.

9. A slurry metering system for directing a slurry from a feed source to a processing unit comprising:
a slurry feed source, a circulation loop which directs said slurry from said feed source to a location closer to said processing unit and back to said feed source, a slurry metering valve placed in-line with said circulation loop, said slurry metering valve comprising a valve body having a primary fluid flow path therethrough from an inlet end to an outlet end, said primary flow path comprising a portion of said circulation loop, a valve stem connected to said valve body and movable through said primary flow path, a valve seat located adjacent said primary flow path and containing a passage therethrough communicating with said primary flow path at a valve seat passage inlet and with a downstream outlet passage in said valve body separate from said primary flow path at a valve seat passage outlet, said downstream outlet passage directing a metered slurry outside said valve body, means to direct said metered slurry from said separate outlet passage to said processing unit, said valve stem comprising and upper valving portion for movement away and against said valve seat for controlling fluid flow through said outlet passage, said valve stem further comprising a lower portion which is movable through said primary flow path and said valve seat passage, said lower portion of said valve stem including a metering component and a cleaning component, said metering component including a gradual downward taper to allow control of fluid flow volume through said valve seat passage when said metering component is placed at said valve seat passage inlet, said cleaning component being below said metering component and having a cut-away portion substantially narrower than said metering component to allow greater fluid flow from said primary flow path to effectively flush and remove accumulated solids from said valve seat passage when said cleaning component is placed at said valve seat passage inlet, at least part of said cleaning component of said valve stem being contained within said valve seat passage when said cleaning component is placed at said valve seat passage inlet.

10. The slurry metering system of claim 9 wherein said cleaning component comprises a diagonal cut across the width of said valve stem.

11. The slurry metering system of claim 9 further including a means to determine the flow rate in said valve seat passage and an actuator connected to said valve stem, said actuator capable of moving said valve stem into engagement with said valve seat passage depending on said determination of said flow rate in said valve seat passage.

12. The slurry metering system of claim 9 wherein said processing unit is chemical reactor.

13. The slurry metering system of claim 9 wherein said processing unit is a separation device for segregating said slurry into a solid component and a liquid component.

14. The slurry metering system of claim 9 wherein said cleaning component is placed adjacent the end of said valve stem.

15. The slurry metering system of claim 11 wherein said flow rate determination means is placed downstream of said outlet passage.

16. A process for directing a metered flow of slurry from a continuous feed of slurry comprises:

passing said continuous feed of slurry through a primary flow path in a slurry metering valve from the inlet of said primary flow path to the outlet end thereof, said metering valve including a valve stem movable through said primary flow path, a valve seat located adjacent said primary flow path, said valve seat containing a passage therethrough communicating with said primary flow path at a valve seat passage inlet and with a downstream outlet passage in said metering valve separate from said primary flow path at a valve seat passage outlet, said valve stem comprising an upper valving portion for movement away and against said valve seat for controlling fluid flow through said outlet passage, said valve stem further comprising a lower portion which is movable through said primary flow path and said valve seat passage, said lower portion of said valve stem containing a metering component and a cleaning component, said metering component including a gradual downward taper to allow control of fluid flow volume through said valve seat passage when said metering component is placed at said valve seat passage inlet, said cleaning component being below said metering component and having a cut-away portion substantially narrower than said metering component to allow greater fluid flow from said primary flow path to effectively flush and remove accumulated solids from said valve seat passage when said cleaning component is placed at said valve seat passage inlet, at least part of said cleaning component of said valve stem being contained within said valve seat passage when said cleaning component is placed at said valve seat passage inlet, metering in said valve a portion of said continuous flow of slurry in said primary flow path through said valve seat passage by placing said metering component at said valve seat passage inlet and directing said metered slurry to said outlet passage, periodically placing said cleaning component of said lower portion of said valve stem at said valve seat passage inlet to flush accumulated solids through said valve seat passage.

17. The process of claim 16 wherein said slurry comprises a pharmaceutically active solid in a liquid carrier.

18. The process of claim 17 wherein said pharmaceutically active solid is an analgesic.

19. The process of claim 18 wherein said analgesic is ibuprofen.

20. The process of claim 18 wherein said analgesic is acetaminophen.

21. The process of claim 16 comprising directing said slurry from said separate outlet passage to a chemical reactor.

22. The process of claim 21 wherein said slurry comprises at least one of a solid monomer and catalyst.

23. The process of claim 16 comprising directing said slurry from said separate outlet passage to a separation wherein the solids of said slurry are segregated from the liquid carrier.

24. The process of claim 17 comprising directing said slurry from said separate outlet passage to a separation wherein the solids of said slurry are segregated from the liquid carrier.

* * * * *